United States Patent Office 3,641,099
Patented Feb. 8, 1972

3,641,099
3-HYDROCARBYLOXYNITRILE SYNTHESIS
Ralph P. Williams, Bartlesville, Okla., assignor to
Phillips Petroleum Company
No Drawing. Filed Aug. 6, 1968, Ser. No. 771,375
Int. Cl. C07c 121/14, 121/46
U.S. Cl. 260—465.6    3 Claims

ABSTRACT OF THE DISCLOSURE

Novel 3-hydrocarbyloxyalkanenitriles are produced by contacting, under anhydrous reaction conditions, a 2-(dihydrocarbyloxyphosphinyl)alkanenitrile, a ketone or aldehyde, and hydrocarbyloxy alkali metal compound, which products are useful as insecticides.

BACKGROUND OF THE INVENTION

This invention relates to a process for the preparation of 3-hydrocarbyloxyalkanenitriles. In accordance with another aspect, novel 3-hydrocarbyloxyalkanenitriles are produced by the reaction of selected 2-(dihydrocarbyloxyphosphinyl)alkanenitriles with a ketone or aldehyde and a hydrocarbyloxy alkali metal compound under anhydrous conditions. In accordance with a further aspect, this invention relates to novel 3-hydrocarbyloxyalkanenitriles. In accordance with a further aspect, this invention relates to novel insecticidal compositions comprising 3-hydrocarbyloxalkanenitriles.

Accordingly, an object of this invention is to provide an improved process for the production of novel substituted nitrile compounds.

A further object of this invention is to provide novel substituted nitriles.

A further object of this invention is to provide a method and compositions useful for combating insects.

Other aspects, objects, and the several advantages of this invention will be apparent to those skilled in the art upon reading the specification and the appended claims.

SUMMARY OF THE INVENTION

In accordance with the invention, 3-hydrocarbyloxyalkanenitriles are synthesized by reacting a 2-(dihydrocarbyloxyphosphinyl)alkanenitrile with a ketone or aldehyde and a hydrocarbyloxy alkali metal compound under substantially anhydrous conditions.

In accordance with one specific embodiment, 3-methoxyhexanenitrile, a novel compound, is produced by the reaction of diethoxyphosphinylethanenitrile, butanal, and sodium methoxide in the substantial absence of water.

Further, in accordance with the invention, the novel 3-hydrocarbyloxyalkanenitriles produced are useful for killing insects. These compounds are especially effective for killing the bean beetle.

DESCRIPTION OF PREFERRED EMBODIMENTS

As one of the reactants, a 2-(dihydrocarbyloxyphosphinyl)alkanenitrile (also referred to as a dihydrocarbyloxycyanoalkylphosphine oxide) is employed having the formula (A)
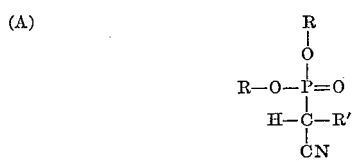

wherein each R is a saturated aliphatic, saturated cycloaliphatic, or aromatic group including alkyl, cycloalkyl, aryl, or combinations thereof, such as aralkyl, alkaryl and the like having from 1-8, inclusive, carbon atoms per R group and up to an including 12 carbon atoms total in both R groups per molecule of said nitrile compound, and wherein R' is hydrogen or an alkyl group having from 1–6, inclusive, carbon atoms.

Representative examples of suitable nitrile compounds having the Formula A defined above that can be employed include:

diethoxyphosphinylethanenitrile
dimethoxyphosphinylethanenitrile
2-(dihexoxyphosphinyl)octanenitrile
2-(2-methylheptoxybutoxyphosphinyl)octanenitrile
diphenoxyphosphinylethanenitrile
2-(hexoxyphenoxyphosphinyl)-3methylheptanenitrile
2-(dicyclohexoxyphosphinyl)-4-ethylhexanenitrile
dicyclopentoxyphosphinylethanenitrile
2-(methoxycyclooctoxyphosphinyl)propanenitrile
pentoxybenzoxyphosphinylethanenitrile
2-[propoxy-2-cyclohexylethoxyphosphinyl]octanenitrile
2-[propoxy-4-ethylcyclohexoxyphosphinyl]butanenitrile
2-[propoxy-3-ethylphenoxyphosphinyl]pentanenitrile
2-[methoxy-2-phenylethoxyphosphinyl]octanenitrile and the like.

The ketones or aldehydes that can be employed as reactants according to the invention have the formula (B)
$$R''-\overset{O}{\underset{\|}{C}}-R'''$$

wherein R'' is an organic radical or group having up to and including 12 carbon atoms, preferably R'' is a hydrocarbyl radical or group such as alkyl, cycloalkyl, aryl, or combinations thereof, such as aralkyl, alkaryl, or the like, but R'' can also optionally contain as many as 2 atoms of nitrogen, oxygen or sulfur, provided that such atoms are not bonded to hydrogen, and further wherein R''' is hydrogen or the same as R''.

Representative examples of suitable ketones or aldehydes having the formula defined above that can be employed include:

ethanal
butanal
dodecanal
tridecanal
nicotinaldehyde
cinchoninaldehyde
p-tolualdehyde
benzaldehyde
1-naphthaldehyde
2-furaldehyde
cyclohexylmethanal
cyclododecylmethanal
7-phenylheptanal
2-phenylethanal
6-(4-tetrahydropyranyl)octanal
4,6-(diethylthio)hexanal
7-cyclohexylheptanal
4-(3-ethylcyclohexyl)pentanal
4,6-(diethoxy)hexanal
acetone
methyl ethyl ketone
methyl isobutyl ketone
1,3-pentacosanone
2-pentanone
3-pentanone
acetophenone
acetonaphthone
1 cyclohexyl-2-methyl-1-propanone
1-(2-furyl)-1-butanone
1-(5-quinolyl)-1-pentanone
methyl 5-quinolyl ketone
benzyl 2-thienyl ketone
bis(1-naphthyl)ketone
benzophenone 1-naphthyl phenyl ketone
bis(5-methyl-2-thienyl)ketone
phenyl 3-pyridyl ketone
bis(4-biphenylyl)ketone
bis(cyclododecyl)ketone
bis(2-benzoxazolyl)ketone
bis(1-benzimidazolyl)ketone
bis(morpholino)ketone
bis(2-pyrazinyl)ketone
bis(4-pyridyl)ketone
bis(2-thiazolyl)ketone
bis(3-thiazolidinyl)ketone
bis(2-quinolyl)ketone
bis(2-quinoxatinyl)ketone
bis(2-methoxyphenyl)ketone
bis(m-cumenyl)ketone
bis(2,4-xylyl)ketone
bis(mesityl)ketone
bis(cyclohexyl)ketone
and the like.

Suitable hydrocarbyloxy alkali metal compounds that can be employed according to the invention have the formula (C) $\qquad$ M—O—R'''' wherein M is a Group I-A alkali metal (Handbook of Chemistry and Physics, Chemical Rubber Company, 45th edition, 1964, page B-2) such as lithium, sodium, potassium, rubidium or cesium, and with the further proviso that R'''' is a hydrocarbon group selected from saturated aliphatic, saturated cycloaliphatic, olefinically unsaturated aliphatic, and aromatic groups having up to and including 12 carbon atoms such as alkyl, cycloalkyl, aryl, alkenyl, or combinations thereof, such as aralkyl, alkaryl, or the like.

Representative examples of suitable hydrocarbyloxy alkali metal compounds having the formula defined above that can be employed include:

sodium methoxide (methyloxy sodium)
potassium methoxide (methoxy potassium)
methyloxy lithium
methyloxy cesium
ethyloxy potassium
methyloxy rubidium
1-dodecyloxy potassium
phenyloxy sodium
2-naphthyloxy potassium
2-biphenyloxy lithium
cyclopentyloxy sodium
cyclododecyloxy potassium
benzyloxy sodium
1-(6-phenylhexy)oxy sodium
p-tolyloxy sodium
3-hexylphenyloxy potassium
cyclohexylmethyloxy potassium
1-(6-cyclohexylhexyl)oxy potassium
2-methylcyclopentyloxy sodium
3-hexylcyclohexyloxy potassium
2,4-xylyloxy lithium
3-butenyloxy sodium
8-dodecenyloxy potassium
and the like.

The 3-hydrocarbyloxyalkanenitriles produced according to the invention have the formula

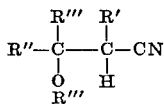

wherein R', R'', R''', and R'''' are as defined with respect to formulas A, B and C, and wherein the 3-hydrocarbyloxyalkanenitrile is in insecticidal adjuvant.

Examples of nitrile compounds produced according to the invention include 3-methoxyhexanenitrile
3-methoxybutanenitrile
3-butyloxybutanenitrile
3-methyl-3-octyloxyoctanenitrile
3-dodecyl-3-dodecyloxy-2-hexylpentadecanenitrile
3-phenyl-3-(6-phenylhexyl)oxy-3-(3-pyridyl)propane-
    nitrile
3-(6-cyclohexylmethyl)oxy-3-mesityl-2-methylhexane-
    nitrile
3-(2-benzooxazolyl)-3-(8-dodecenyl)oxy-3-(2-thiazolyl)
    propanenitrile
3-(1-benzimidoazolyl)-3-(2,4-xylyl)-3-(2,4-xylyl)
    oxypropanenitrile and the like.

One of the products of the invention, 3-methoxyhexanenitrile, has been conveniently prepared by the reaction of diethoxyphosphinylethanenitrile, butanal, and sodium methoxide in dimethylformamide as reaction medium.

Temperatures to be employed in effecting the above conversion can be in the range of about 5 to about 110° C., preferably in the range of about 25 to about 80° C. Though atmospheric pressure is generally employed because of convenience, either superatmospheric or subatmospheric pressures can also be employed, normally in the range of about 7 p.s.i. to about 100 p.s.i. absolute. Normally, sufficient pressure is employed to maintain the reactants in substantially the liquid phase. Sufficient time of reaction should be employed to effect the degree of conversion desired, normally reaction times in the range of about 10 minutes to about 72 hours are suitable. Suitable diluents can also be employed. Such diluents should be substantially completely nonreactive in the reaction environment. For example, diluents such as tetrahydrofuran, dimethylformamide, benzene, xylene, hexane, and the like can be employed. Normally, an excess of the alcohol related to the hydrocarbyloxy alkali metal compound is preferably used.

The compounds represented above by Formulas A and B are known materials and can be prepared or synthesized by any means known to the art. For example, chloroethanenitrile can be reacted with triethyl phosphite to give diethoxyphosphinylethanenitrile. Many of the ketones and aldehydes which can be employed according to the process of this invention are readily available as items of commerce.

The hydrocarbyloxy alkali metal compounds to be employed according to the process of this invention are preferably prepared in situ by adding an alkali metal to the respective alcohol. For example, sodium can be added to methanol, preferably an excess of methanol, to give sodium methoxide in methanol solution. Ordinarily, an excess of the alcohol is employed as a diluent in the conversion of the other reactants to 3-hydrocarbyloxyalkanenitriles according to the process of this invention. Of course, any other means known to the art can be employed to contact the hydrocarbyloxy alkali metal compound with the other reactants.

It is essential that the reaction of this invention be effected under substantially anhydrous conditions to obtain a maximum yield of the desired product.

The 3-hydrocarbyloxyalkanenitrile products can be separated by any means known to the art such as distillation, solvent extraction, crystallization, chromatography, or the like.

The above conversion can be carried out in ordinary equipment by ordinary chemical techniques known to the art.

The 3-hydrocarbyloxyalkanenitrile compounds of this invention are useful to kill insects. As demonstrated by working examples hereinbelow, one of the compounds of the invention, 3-methoxyhexanenitrile, was effective in killing Mexican bean beetles.

The insecticides of this invention can be applied in conventional manner such as in solutions, emulsions, dust, wettable powders, aerosols, and the like. Adjuvants or solvents which can be employed include such materials as naphtha, kerosene, toluene, cyclohexanone, acetone, and the like. One particularly effective solvent which can be used is an isoparaffinic hydrocarbon boiling in the approximate range of 260° F. to 800° F., which is sold under the trademark of Soltrol, usually produced by HF alkylation of an isoparaffin with an olefin.

The amount of insecticide in the solutions, emulsions, etc., can vary over a wide range, but will generally be within the range of about 0.05 to 20 percent by weight. In some instances even lower concentrations can be used while the upper limit is dictated primarily by economics.

When applying the insecticides of this invention to an area from which it is desired to kill insects, such as Mexican bean beetles, the method of application will be chosen so as to deposit from 0.1 to 25 grams per 100 square feet. It is also to be understood that these insecticides can be used as space sprays, employing such means a aerosol bombs.

EXAMPLE I

To a stirred reactor was charged 139.0 g. (0.785 mole) of diethoxyphosphinylethanenitrile (diethoxycyanomethylphosphine oxide), 105 ml. dimethylformamide, and 56.5 g. (0.785 mole) of butanal (butyraldehyde). To the mixture was then added a solution prepared by the mixing of 22.3 g. of sodium, 175 ml. of methanol, and 69 ml. of dimethylformamide over a 13 minute period with the temperature of the reactor contents maintained at about 50° C. The resultant mixture was stirred at 30 to 50° C. for 1.66 hours. Glacial acetic acid (60 g.) and 350 ml. of water were then added. The mixture was extracted with ether. The ether extract was washed with water and dried over magnesium sulfate. Upon evaporation of the ether, the residue was fractionally distilled to yield 41.8 g. of 3-methoxyhexanenitrile (boiling point 113° C., 50 ml. Hg, $n_D^{20}$ 1.4203). Elemental composition calculated for 3-methoxyhexanenitrile is: 66.2 percent carbon, 10.2 percent hydrogen, and 11.0 percent nitrogen. Elemental composition of the above product determined by analysis was: 65.7 percent carbon, 10.1 percent hydrogen, and 10.5 percent nitrogen.

The mass spectrum of the sample was consistent with the spectrum that would be expected from 3-methoxyhexanenitrile. The 41.8 g. of product recovered constituted a 42 mole percent yield based on the diethoxyphosphinylethanenitrile or butanal charged.

EXAMPLE II

To a stirred reactor was charged 35.4 g. (0.2 mole) of diethoxyphosphinylethanenitrile, 14.4 g. (0.2 mole) of butanal, and 35 ml. of dimethylformamide. To the reactor over a period of one hour and 10 minutes was then added a mixture comprised of 4.6 g. (0.2 atom) of sodium metal, 40 ml. methanol, and 15 ml. dimethylformamide. Temperature was maintained in the range of 45 to 50° C. Fifty minutes later 2.2 g. of acetic acid was added to neutralize. The reaction mixture was then allowed to stand at room temperature for about 50 hours. The reaction mixture was then diluted with 250 ml. of water and extracted with ether. The ether extract was washed with water, dried over magnesium sulfate, filtered, and concentrated on a steam bath under vacuum to 22.4 g. of liquid residue. Chromatographic analysis indicated that the 22.2 g. of residue was substantially 3-methoxyhexanenitrile. Thus a yield of 87.4 mole percent was effected as based on the diethoxyphosphinylethanenitrile or butanal charged.

EXAMPLE III

To a stirred reactor was charged 35.4 g. (0.2 mole) of diethoxyphosphinylethanenitrile, 14.4 g. (0.2 mole) of butanal, and 50 ml. of dimethylformamide. To the mixture over a 3 minute period was then added a mixture comprised of 12.4 g. sodium hydroxide and 10 g. water with high speed stirring which was required for good mixing. Temperature was maintained in the range of about 25 to about 40° C. A total of 7.3 g. of glacial acetic acid in 100 ml. of water was added after 2 additional minutes.

The product was recovered as in Example II. A yield of 16.4 g. of a near-colorless liquid was obtained which was indicated by chromatography to be high purity cis and trans alpha-hexenenitrile. This constituted a yield of 86.0 mole percent based on the diethoxyphosphinylethanenitrile or butanal charged.

This control example demonstrates the importance of excluding water from the reaction mixture when synthesis of 3-hydrocarbyloxyalkanenitriles is desired.

EXAMPLE IV 3-methoxyhexanenitrile, produced by the process exemplified by Examples I and II, was demonstrated to have lethal effects on the Mexican bean beetle by the following:

Mexican bean beetle leaf spray test

This test determines the insecticidal activity of the compound being tested against the Mexican bean beetle (*Epilachna varivestis*).

The test species is composed of one-day larvae of the Mexican bean beetle. Paired fully expanded primary leaves excised from Pinto bean plants are maintained in Aquapics and sprayed with 50 ml. of the test formulation in a turntable spray hood. This test formulation contains 0.1 g. chemical (or 0.1 ml. if a liquid), 4.0 ml. acetone, 2.0 ml. stock emulsifier solution (0.5% Triton X–155 in water by volume), and 94.0 ml. distilled water. The concentration of toxicant in this formulation is 1000 parts per million. Lower concestrations of toxicant are obtained by diluting the formulation with distilled water.

After the chemical deposit on the leaves is dry, the paired leaves are separated, and only one of the leaves, selected at random, is used for the test. This leaf is placed onto 1.5% water agar (15 ml. per 100 mm. polystyrone disposable petri dish) and is infested with 10 one-day old Mexican bean beetle larvae. There are held at 72° F. for three days when mortality and feeding inhibition are determined. The feeding inhibition is an indication of the repellent properties of the test material. Results of insecticidal activity are given in the following table:

Compound test: 3-methoxyhexanenitrile
  Concentration, p.p.m. _____ 1000
  Percent mortality _____ 30

I claim:
1. A process for the preparation of 3-hydrocarbyloxynitriles, of the formula

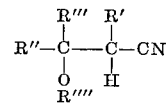

comprising contacting, under anhydrous reaction conditions,
(a) a 2-(dihydrocarbyloxyphosphinyl)nitrile having the formula

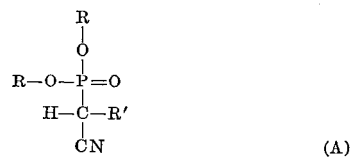

wherein R and R′ are hydrocarbyl radicals having 1–8, inclusive, carbon atoms per R group and up to and including 12 carbon atoms, total in both R groups per molecule, with the further proviso that R′ can be hydrogen with
(b) a ketone or aldehyde compound having the formula

wherein R″ and R′″ are saturated hydrocarbyl radicals having up to and including 12 carbon atoms, with the further proviso that R''' can be hydrogen, and (c) a hydrocarbyloxy alkali metal compound having the formula $$M—O—R'''' \qquad (C)$$

wherein M is a Group I-A alkali metal and R'''' is a hydrocarbyl radical having up to and including 12 carbon atoms, for a time in the range from 10 minutes to 72 hours at a temperature in the range 5° to 110° C. and under sufficient pressure to maintain liquid phase conditions.

2. A process according to claim 1 wherein the reaction is carried out in the presence of a reaction diluent which is substantially completely nonreactive in the reaction environment.

3. A process according to claim 1 wherein 3-methoxyhexanenitrile is formed by reacting diethoxyphosphinylethanenitrile with butanal and a hydrocarbyloxy alkali metal formed by the reaction of sodium with methanol in dimethylformamide and wherein the entire reaction is carried out in the presence of dimethylformamide as the reaction diluent.

References Cited

UNITED STATES PATENTS

| 2,794,042 | 5/1957 | Tanona et al. | 260—465.6 X |
| 3,138,616 | 6/1964 | Scotti et al. | 260—465.6 X |
| 3,157,660 | 11/1964 | Stilz et al. | 260—465.6 X |
| 3,157,655 | 11/1964 | Takamizawa et al. | 260—465.6 X |
| 3,513,185 | 5/1970 | Cresswell et al. | 260—465.6 X |

OTHER REFERENCES

Bruylants, C.A., vol. 19 (1925), p. 37.

JOSEPH PAUL BRUST, Primary Examiner

U.S. Cl. X.R.

260—247.7, 250 R, 283 CN, 288 R, 289 R, 294.9, 302, 306.7, 307, 309.2 332.3 R, 345.9, 347.8 464, 465 F; 424—304